(12) United States Patent
Fujiwara (10) Patent No.: US 9,688,223 B2
(45) Date of Patent: Jun. 27, 2017

(54) LIQUID LEAD STORAGE BATTERY AND BATTERY SYSTEM

(75) Inventor: Yoshiomi Fujiwara, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 898 days.

(21) Appl. No.: 13/985,776

(22) PCT Filed: Feb. 20, 2012

(86) PCT No.: PCT/JP2012/053999
§ 371 (c)(1),
(2), (4) Date: Aug. 15, 2013

(87) PCT Pub. No.: WO2012/120999
PCT Pub. Date: Sep. 13, 2012

(65) Prior Publication Data
US 2013/0320758 A1    Dec. 5, 2013

(30) Foreign Application Priority Data

Mar. 8, 2011    (JP) .................................. 2011-050334

(51) Int. Cl.
*H01M 10/06* (2006.01)
*B60R 16/03* (2006.01)
(Continued)

(52) U.S. Cl.
CPC ............... *B60R 16/03* (2013.01); *H01M 2/16* (2013.01); *H01M 2/18* (2013.01); *H01M 4/14* (2013.01);
(Continued)

(58) Field of Classification Search
CPC ............... H01M 10/14; H01M 2/1666; H01M 10/06–10/18; H01M 2/18
See application file for complete search history.

(56) References Cited

U.S. PATENT DOCUMENTS 3,862,861 A * 1/1975 McClelland ........ H01M 2/1613
429/245
4,262,068 A * 4/1981 Kono .................. H01M 2/1613
429/204

(Continued)

FOREIGN PATENT DOCUMENTS

CN    101257129 A    9/2008
JP    58-123659    7/1983

(Continued)

OTHER PUBLICATIONS

English translation of Chinese Office Action dated Jun. 9, 2015 issued for the corresponding Chinese patent application No. 201280003925.0.

(Continued)

*Primary Examiner* — Maria J Laios
(74) *Attorney, Agent, or Firm* — Rankin, Hill & Clark LLP (57) ABSTRACT

A liquid lead storage battery includes a negative electrode plate, a positive electrode plate and an electrolyte solution. The both plates are arranged so as to face each other in a thickness direction and immersed in the electrolyte solution. The negative electrode plate includes an active material containing carbon. An elastic sheet formed of a porous material is arranged between the negative electrode plate and the positive electrode plate so as to press the negative electrode plate from both sides in the thickness direction.

13 Claims, 3 Drawing Sheets

(51) Int. Cl.
  *H01M 2/16* (2006.01)
  *H01M 4/14* (2006.01)
  *H01M 10/12* (2006.01)
  *H01M 2/18* (2006.01)
  *H01M 4/583* (2010.01)

(52) U.S. Cl.
  CPC ........... *H01M 4/583* (2013.01); *H01M 10/06* (2013.01); *H01M 10/12* (2013.01); *Y02E 60/126* (2013.01)

(56) References Cited

U.S. PATENT DOCUMENTS

| | | | |
|---|---|---|---|
| 4,631,241 A | 12/1986 | Kawanami | |
| 4,637,966 A * | 1/1987 | Uba | H01M 10/342 429/228 |
| 5,470,676 A * | 11/1995 | Nakano | H01M 2/18 429/139 |
| 5,948,567 A | 9/1999 | Heller | |
| 6,005,786 A * | 12/1999 | Bluemel | H02K 3/28 307/71 |
| 2008/0199769 A1 * | 8/2008 | Saito | H01M 2/1613 429/142 |
| 2012/0237829 A1 | 9/2012 | Fujiwara | |

FOREIGN PATENT DOCUMENTS

| | | |
|---|---|---|
| JP | 61-32365 | 2/1986 |
| JP | 06-196142 | 7/1994 |
| JP | 07-111164 | 4/1995 |
| JP | 3185508 | 7/2001 |
| JP | 2006-086039 | 3/2006 |
| JP | 2006-093047 | 4/2006 |
| JP | 2006-100082 | 4/2006 |
| JP | 2006-156060 | 6/2006 |
| JP | 2008-171709 | 7/2008 |
| WO | 98/31061 | 7/1998 |
| WO | 2011/090113 | 7/2011 |

OTHER PUBLICATIONS

International Search Report dated Apr. 24, 2012 filed in PCT/JP2012/053999.

* cited by examiner

Second Modification Example

Fig. 3

LIQUID LEAD STORAGE BATTERY AND BATTERY SYSTEM

TECHNICAL FIELD

The present invention relates to a liquid lead storage battery and a battery system using the same.

BACKGROUND ART

With introduction of idling stop cars or the like, liquid lead storage batteries have been increasingly used in a partially charged state (Partial State of Charge; PSOC). For use in PSOC, the liquid lead storage battery often ends its life due to sulfation of a negative electrode. Negative electrode sulfation is a phenomenon in which a negative active material is changed into lead sulfate which is bulky and difficult to be reduced to metal lead, so that a storage battery loses its capacity. It is known to be effective to add fine and electrically conductive carbon such as carbon black to a negative active material in a large amount for suppressing negative electrode sulfation (Patent Document 1; JP 3185508 B). For example, Patent Document 1 discloses that negative electrode sulfation can be suppressed by including 0.4 to 7.5% by mass of carbon in a negative active material of a sealed (valve regulated) lead storage battery. In the sealed lead storage battery, an electrolyte solution is retained in a retainer mat, and therefore has low fluidity. Therefore, such a problem hardly occurs that carbon flows out from the negative active material into the electrolyte solution and spreads.

When a large amount of carbon is included in a negative active material in a liquid lead storage battery with an electrolyte solution existing in a flow state, carbon, which is in the form of fine particles, flows out into the electrolyte solution to make the electrolyte solution turbid. Also, since a difference in specific gravity between carbon and the electrolyte solution is relatively small, carbon is blown up by convection of the electrolyte solution and a generated gas, and deposited on the upper part of an element, so that a short circuit may be caused in the worst case. Therefore, in the liquid lead storage battery, it is difficult to include 0.3% by mass or more of carbon in the negative active material.

PRIOR ART DOCUMENT

Patent Document

Patent Document 1: JP 3185508 B

SUMMARY OF THE INVENTION

Problems to be Solved by the Invention

A basic object of the present invention is to improve life performance of a liquid lead storage battery for use in PSOC by suppressing the outflow of carbon from a negative active material of the liquid lead storage battery.

Means for Solving the Problems

The present invention provides a liquid lead storage battery having a negative electrode plate, a positive electrode plate and an electrolyte solution, the both plates being arranged so as to face each other in a thickness direction and immersed in the electrolyte solution, wherein the negative electrode plate includes an active material containing carbon, and an elastic sheet formed of a porous material is arranged between the negative electrode plate and the positive electrode plate so as to press the negative electrode plate from both sides in the thickness direction.

In the present invention, the outflow of carbon from a negative active material is suppressed by pressing the negative electrode plate with the elastic sheet. Therefore, the electrolyte solution does not become turbid, e.g., the visibility of the liquid surface level is improved, and carbon hardly causes a short circuit between a negative electrode and a positive electrode. Further, carbon remains in the negative active material and therefore provides a current path during charging, so that sulfation can be suppressed. Accordingly, PSOC life performance is improved.

Preferably the elastic sheet abuts on the surface of the negative electrode plate directly, i.e., without sandwiching other members between the elastic sheet and the negative electrode plate. The elastic sheet is deformable, and therefore abuts on the surface of the negative electrode plate so as to be in close contact therewith along an irregularity of the surface of the negative electrode plate, so that the outflow of carbon is prevented more reliably. Therefore, turbidity of the electrolyte solution is insignificant and PSOC life performance is excellent when the elastic sheet is made to abut on the negative electrode plate rather than on the positive electrode plate.

More preferably, a microporous thin film sheet, which is porous and thinner than the elastic sheet and has an average pore diameter smaller than that of the elastic sheet, is arranged between the positive electrode plate and the elastic sheet. Since the microporous thin film sheet has a small average pore diameter, a short circuit between the positive electrode plate and the negative electrode plate, which results from deposition of metal lead and the like, is prevented. Since the microporous thin film sheet is thinner than the elastic sheet, the liquid lead storage battery can be made compact. A microporous separator in Example is an example of the thin film sheet.

Further preferably, the thin film sheet abuts on the surface of the positive electrode plate directly. A compact liquid lead storage battery is obtained as compared to the case where other members are arranged between the positive electrode plate and the thin film sheet.

Preferably, the elastic sheet has a porosity of more than 90% and 95% or less, or an average pore diameter of 100 μm or more, and especially preferably the elastic sheet has a porosity of more than 90% and 95% or less and an average pore diameter of 100 μm or more. Since the porosity is high, or the average pore diameter is large, the fluidity of the electrolyte solution in the elastic sheet is improved, and resultantly the ionic conductivity is increased, so that the internal resistance decreases as characteristics of the storage battery. Preferably, the elastic sheet is formed of fibers of glass or the like, which has a diameter of 10 μm or more and 100 μm or less. For obtaining an elastic sheet having an average pore diameter of 100 μm or more and a porosity of more than 90% and 95% or less, a sheet formed of fibers having a diameter of 10 μm or more and 100 μm or less is preferred.

The negative electrode plate is pressed under a pressure of preferably 10 kPa or more, more preferably 20 kPa or more, further preferably 40 kPa or more, still further preferably 100 kPa or more. The pressing force is a pressing force in the electrolyte solution in the finished storage battery, rather than a pressing force in the air during assembly when the negative electrode plate and the positive electrode plate are set in a container. When the negative electrode plate is pressed under a pressure of 10 kPa or more and less than 300 kPa, the outflow of carbon from the negative active material can be sufficiently suppressed, and excessive pressure is not applied to the container and the like of the storage battery.

The negative active material contains the carbon in an amount of preferably 0.3% by mass or more, and more preferably 0.5% by mass or more. The negative active material contains the carbon in an amount of less than 10% by mass, preferably 5.5% by mass or less, and still further preferably 5% by mass or less. When the negative electrode plate is pressed with the elastic sheet, the outflow of carbon in an amount of 0.3% by mass or more and less than 10% by mass can be remarkably suppressed, and especially when carbon is contained in an optimum amount, a storage battery having remarkably excellent PSOC life performance is obtained.

Especially preferably, the elastic sheet has a porosity of 90% or more and 95% or less and an average pore diameter of 100 μm or more, the elastic sheet is formed of fibers, e.g., inorganic fibers such as glass fibers, having a diameter of 10 μm or more and 100 μm or less, the negative electrode plate is pressed under a pressure of 10 kPa or more and 100 kPa or less, and the negative active material contains the carbon in an amount of 0.5% by mass or more and 5% by mass or less. Consequently, a liquid lead storage battery, which has low internal resistance and especially excellent life performance for use in PSOC and in which the outflow rate of carbon is especially low, is obtained.

Preferably, the lead storage battery further includes a container in which the negative electrode plate and the positive electrode plate are stored and an electrolyte solution is retained, wherein a gap is formed between any one of the upper parts, side faces and bottom faces of the negative electrode plate and the positive electrode plate, and the container. Consequently, the fluidity of the electrolyte solution is enhanced.

The present invention also provides a battery system for an idling stop car, including the liquid lead storage battery, and a controller for operating a load by means of electric power of the liquid lead storage battery without using electric power of an alternator at least at the time when the vehicle is stopped. Descriptions regarding the liquid storage battery also apply to the battery system directly. In the battery system for an idling stop car, excellent PSOC life performance is necessary because the frequency with which the lead storage battery is discharged is increased and the frequency with which the lead storage battery is charged is decreased. Since the lead storage battery is a liquid lead storage battery, it is necessary that the liquid surface of the electrolyte solution be capable of being identified for water addition and the like. In the battery system using the liquid lead storage battery of the present invention, life performance in PSOC is high, and turbidity of the electrolyte solution is insignificant because the outflow rate of carbon is low, so that a battery system suitable for an idling stop car is obtained.

Carbon is, for example, carbon black such as furnace black, acetylene black or ketjen black, but it may be graphite, a carbon fiber or the like. In pressing of the negative electrode plate, for example, a pressing force acts between the negative electrode plate and the positive electrode plate, and the pressing force of the negative electrode plate is received by the positive electrode plate, but the pressing force may be received by a member other than the positive electrode plate, such as the container. When a porous elastic sheet is arranged between the negative electrode plate and the positive electrode plate, and a pressing force is applied by compressing the sheet at the time of assembling an element, the pressing force can be easily retained. The thin film sheet, e.g., the microporous separator in Example prevents a short circuit between the positive electrode and the negative electrode. In arrangement of the porous elastic sheet and the thin film sheet, when an arrangement is made such that the elastic sheet abuts on the negative electrode plate and the thin film sheet abuts on the positive electrode plate (Example in FIG. 1), the outflow of carbon can be more effectively suppressed, and PSOC life performance can be further improved (Tables 1 and 2).

In the present invention, a pressing force is applied to the negative electrode plate to suppress the outflow of carbon in the negative active material into the electrolyte solution. For example, an outflow suppressing effect emerges at a pressing force of 1 kPa or more, and the effect becomes significant at a pressing force of 10 kPa or more, and becomes further significant at a pressing force of 20 kPa or more, and especially 40 kPa or more. On the other hand, it has become apparent that the pressing force is preferably less than 300 kPa, and in particular preferably 100 kPa or less, in terms of degradation of constitutional members, such as breakage of the container. In the present invention, since a large amount of carbon can be included in the negative active material, for example, a sulfation suppressing effect emerges when the content of carbon is 0.1% by mass or more, and the effect becomes significant when the content of carbon is 0.3% by mass or more. On the other hand, it has become apparent that the content of carbon is preferably less than 10% by mass, preferably 5.5% by mass or less, and in particular 5% by mass or less, from the viewpoint of turbidity of the electrolyte solution or fragility of the negative electrode plate.

MODE FOR CARRYING OUT THE INVENTION

Example and Modification Example of the invention of the present application will be described below. When the invention of the present application is practiced, Example and Modification Example may be appropriately changed in accordance with common knowledge of those skilled in the art and disclosure of prior arts.

EXAMPLE

Figure 1:
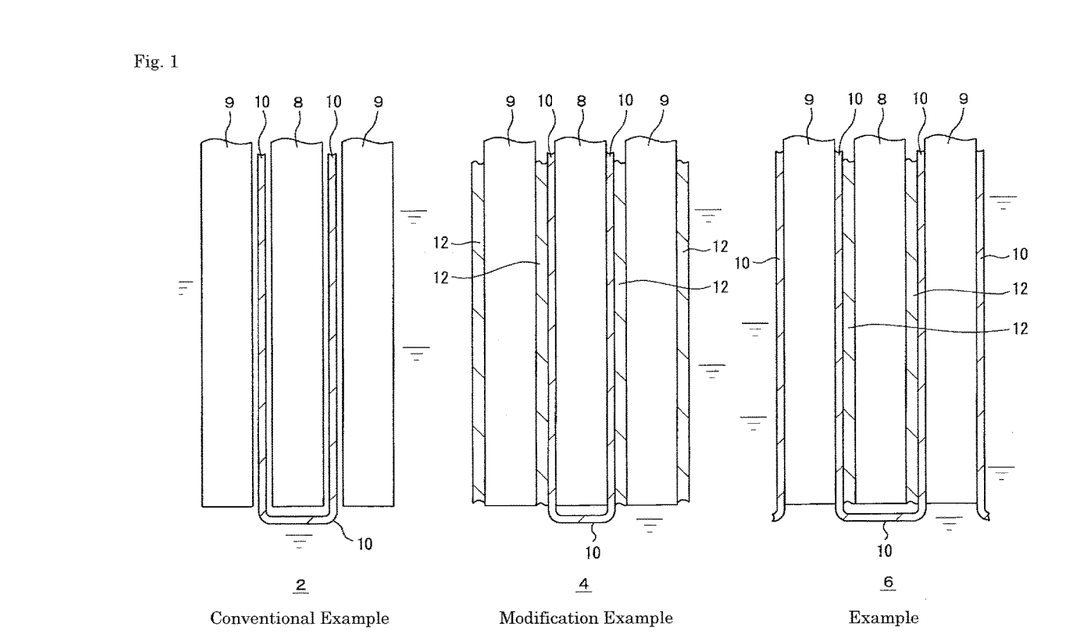
FIG. 1: Vertical sectional views showing principal constitutional parts of lead storage batteries in Conventional Example, Modification Example and Example.

FIG. 1 shows vertical sectional views of principal constitutional parts of liquid lead storage batteries in Example, Modification Example and Conventional Example, and Tables 1 and 2 show the performance of the liquid lead storage batteries. In FIG. 1, reference numerals 2, 4 and 6 denote principal constitutional parts of liquid lead storage batteries of Conventional Example, Modification Example and Example, respectively. Reference numeral 8 denotes a negative electrode plate, and reference numeral 9 denotes a positive electrode plate. The negative electrode includes an active material containing spongy lead and the positive electrode includes an active material containing lead dioxide with each electrode further including a general grid formed of a lead-calcium-tin-based or lead-calcium-based alloy. A method for production of each grid is arbitrary. The negative active material includes carbon; lignin, synthetic resin fibers, barium sulfate or the like; and a lead powder. The "% by mass" as a content of carbon is a ratio to the mass of the lead powder. The positive active material includes lead dioxide and synthetic resin fibers or the like. The composition of the positive active material is arbitrary. Reference numeral 10 denotes a microporous separator (microporous thin film sheet) of polyethylene, paper or the like, and its material is arbitrary as long as it is acid-resistant enough to endure dilute sulfuric acid as an electrolyte solution, and is excellent in oxidation resistance. Reference numeral 12 denotes an elastic sheet, for example a glass fiber sheet. The separator 10 is bag-shaped, and the negative electrode plate 8 is stored in the separator 10, but the separator 10 may not be bag-shaped, or may be bag-shaped and store the positive electrode plate 9. The storage battery 2, in which the elastic sheet 12 is absent and a pressing force is not applied to the negative electrode plate 8, corresponds to Conventional Example. The storage battery 4, in which the elastic sheet 12 abuts on the positive electrode plate 9, corresponds to Modification Example. The storage battery 6, in which the elastic sheet 12 abuts on the negative electrode plate 8, corresponds to Example. Example and Modification Example are identical except for arrangement of the separator 10 and the elastic sheet 12. The elastic sheet 12 is in direct contact with the surface of the negative electrode plate 8 or the positive electrode plate 9. The elastic sheet 12 is in close contact with the surface of the electrode plate 8 or 9 by a pressing force while being deformed so as to fit with an irregularity thereof. The electrode plates 8 and 9 face each other in a thickness direction, and the elastic sheet 12 and the separator 10 exist between the electrode plates 8 and 9.

The separator 10 normally includes a rib (not shown) that abuts on the positive electrode plate 9, but may not include the rib. The electrolyte solution is formed of dilute sulfuric acid, but may contain alkali metal ions, aluminum ions and the like.

In Modification Example and Example, the negative active material contains electrically conductive carbon, for example carbon black, and a pressing force is applied to the negative electrode plate 8 and the positive electrode plate 9 from the elastic sheet 12. All of the storage batteries, the principal constitutions of which are shown in FIG. 1, are liquid storage batteries, wherein the negative electrode plate 8 and the positive electrode plate 9 are immersed in a sufficient electrolyte solution, and gaps between the upper parts, side faces and bottom faces of the electrode plates 8 and 9 and a container, and the like provide a space through which the electrolyte solution flows. A storage battery in which the principal constitution of the storage battery is identical to that of Example or Modification Example, but a pressing force is not applied to the negative electrode plate 8 is defined as Comparative Example.

Experimental Production of Lead Storage Battery

For evaluating PSOC life performance and presence/absence of the outflow of carbon, lead storage batteries (Conventional Example, Comparative Example, Modification Example and Example) were prepared. A negative active material raw material was prepared so as to contain 0.2% by mass of lignin, 0.5% by mass of barium sulfate and 0.1% by mass of synthetic resin fibers with the balance being constituted by a lead powder while the content of carbon black having an average primary particle size of 40 nm was changed within a range of from 0.3% by mass to 10% by mass. Thereto were added water and sulfuric acid to form a paste. The paste was applied to a negative electrode grid formed of a lead-calcium-tin-based alloy, cured and dried to form a negative electrode plate having a thickness of 1.5 mm. Next, 0.1% by mass of synthetic resin fibers and 99.9% by mass of a lead powder were mixed. Water and sulfuric acid were added to the mixture to form a paste. The paste was applied to a positive electrode grid formed of a lead-calcium-tin-based alloy, cured and dried to form a positive electrode plate having a thickness of 1.7 mm. In Example, an elastic sheet formed of a glass fiber sheet having a thickness of 0.8 mm abutted on both surfaces of the negative electrode plate, and a polyethylene separator having a thickness of 0.6 mm surrounded the outer side thereof. In Modification Example, the elastic sheet abutted on both surfaces of the positive electrode plate, and the separator surrounded the negative electrode plate. Five negative electrode plates were welded to one another by a strap. Four positive electrode plates were welded to one another by a strap. The negative electrode plates and the positive electrode plates were alternately sandwiched to form an element. The element was stored in a container. At this time, the element was assembled so that the elastic sheet was compressed to apply a pressing force to the negative electrode plate, the pressing force was measured by a pressure sensor (trade name: FlexiForce, manufactured by NITTA Corporation) mounted at the central part of the negative electrode plate, and the pressing force after production would be a target value. Into the container in which the element was stored, dilute sulfuric acid as an electrolyte solution was poured so that the specific gravity after formation would be 1.28, whereby container formation was performed. The container was formed of a transparent acrylic resin plate as a material of the container so that the electrolyte solution in the container could be observed from the side face.

The elastic sheet is, for example, a mat of fibers of C grade glass having a diameter of 10 μm or more and 100 μm or less, can be elastically deformed in the electrolyte solution, and has acid resistance. For example, the elastic sheet preferably has a porosity of more than 90% and 95% or less, an average pore diameter of 100 μm or more, and a thickness of 0.35 mm or more and 1 mm or less. In Example, the porosity was 93%, the average pore diameter was 120 μm, the thickness was 0.5 mm and the fiber diameter was 19 μm. The porosity and the average pore diameter were measured using a pore distribution measuring device "Auto Pore 1119405" manufactured by SHIMADZU CORPORATION. The fiber diameter was measured with an average for 100 fibers as the fiber diameter using a scanning electron microscope (JSM-T 330A) manufactured by JEOL Ltd. Those similar to the elastic sheet of the present invention include a retainer mat that is used in a valve regulated lead storage battery. The retainer mat is a dense mat which includes glass fibers having a fiber diameter of 0.5 μm or more and 5 μm or less, for example 0.8 μm, has a porosity of 80% or more and 90% or less, a maximum pore diameter of 30 μm or less and an average pore diameter of 5 to 10 μm, and a thickness of 0.5 mm or more and 1.2 mm or less. The elastic sheet of the present invention has a high porosity and a large average pore diameter as compared to the retainer mat, and therefore the fluidity of the electrolyte solution in the elastic sheet is high. Accordingly, the ionic conductivity is excellent, and the internal resistance of the storage battery is low. As the polyethylene separator, for example, a polyethylene separator having a porosity of 50% or more and 60% or less, a maximum pore diameter of 1 μm or less and an average pore diameter of 0.05 μm or more and 1 μm or less, and a thickness of 0.15 mm or more and 0.25 mm or less can be used. The thickness of the separator is a thickness of a part other than the rib. By making the separator thinner than the elastic sheet, the storage battery is made compact, and an increase in internal resistance is prevented. By decreasing the average pore diameter, a short circuit between the positive electrode plate and the negative electrode plate is prevented. By allowing an elastic sheet, which is more elastic and deformable than the separator, to abut on the surface of the negative electrode plate directly, the area of a portion of the elastic sheet which is in close contact with the negative electrode plate is increased to reliably prevent the outflow of carbon.

Test Method

Three storage batteries of each of Conventional Example, Comparative Example, Modification Example and Example were experimentally produced for each of the carbon content and the pressing force. The pressing force was measured with a pressure sensor mounted on the negative electrode plate, and the pressure sensor was removed, followed by conducting the following test. The storage battery was placed in a water bath at 25° C. First the storage battery was discharged at 1 CA×6 minutes as transfer, and thereafter discharge at 1 CA×18 minutes and charge at 1 CA×18 minutes were repeated as cycle charge-discharge with the one-hour rate current expressed as 1 CA. The life was considered to end when the output voltage became 1.0 V or less during discharge for 18 minutes, and the number of cycles until the end of the life was measured. The state of turbidity of the electrolyte solution at the time of the end of the life was observed.

Test Results

Test results are shown in Tables 1 and 2. Life performance is shown as an average for three storage batteries and as a relative value when the life performance of Conventional Example, in which the carbon content is 0.3% by mass and the elastic sheet is absent, is 100. For the state of turbidity of the electrolyte solution, × was assigned when the electrolyte was significantly turbid through visual inspection. ○ was assigned when the electrolyte solution was only slightly turbid, the element in the container could be visually recognized from the side face of the container, and the liquid surface level could be visually recognized. ⊚ was assigned when the electrolyte solution was hardly turbid. In total assessment, ○ was assigned when ○ or ⊚ was assigned for the state of turbidity and life performance was 120 or more and less than 140, and ⊚ was assigned when ⊚ was assigned for the state of turbidity and life performance was 140 or more.

TABLE 1

| Sample No. | Carbon (% by mass) | Pressing force (kPa) | Glass sheet abutting side | Life performance | State of turbidity of electrolyte solution | Total assessment | Remarks |
|---|---|---|---|---|---|---|---|
| 1 | 0.30 | 0 | — | 100 | ○ | X | Conventional Example |
| 2 | 0.30 | 10 | Positive Electrode | 102 | ⊚ | X | Modification Example |
| 3 | 0.30 | 10 | Negative Electrode | 103 | ⊚ | X | Example |
| 4 | 0.30 | 40 | Positive Electrode | 104 | ⊚ | X | Modification Example |
| 5 | 0.30 | 40 | Negative Electrode | 105 | ⊚ | X | Example |
| 6 | 0.50 | 0 | — | 103 | X | X | Comparative Example |
| 7 | 0.50 | 10 | Positive Electrode | 120 | ○ | ○ | Modification Example |
| 8 | 0.50 | 20 | Positive Electrode | 122 | ○ | ○ | Modification Example |
| 9 | 0.50 | 40 | Positive Electrode | 124 | ○ | ○ | Modification Example |
| 10 | 0.50 | 70 | Positive Electrode | 126 | ⊚ | ○ | Modification Example |
| 11 | 0.50 | 100 | Positive Electrode | 128 | ⊚ | ○ | Modification Example |
| 12 | 0.50 | 300 | Positive Electrode | — | — | — | — |
| 13 | 0.50 | 10 | Negative Electrode | 141 | ⊚ | ⊚ | Example |
| 14 | 0.50 | 20 | Negative Electrode | 146 | ⊚ | ⊚ | Example |
| 15 | 0.50 | 40 | Negative Electrode | 150 | ⊚ | ⊚ | Example |
| 16 | 0.50 | 70 | Negative Electrode | 150 | ⊚ | ⊚ | Example |
| 17 | 0.50 | 100 | Negative Electrode | 151 | ⊚ | ⊚ | Example |
| 18 | 0.50 | 300 | Negative Electrode | — | — | — | — |
| 19 | 1.00 | 0 | — | 110 | X | X | Comparative Example |
| 20 | 1.00 | 10 | Positive Electrode | 122 | ○ | ○ | Modification Example |
| 21 | 1.00 | 20 | Positive Electrode | 126 | ○ | ○ | Modification Example |
| 22 | 1.00 | 40 | Positive Electrode | 130 | ○ | ○ | Modification Example |
| 23 | 1.00 | 70 | Positive Electrode | 130 | ⊚ | ○ | Modification Example |
| 24 | 1.00 | 100 | Positive Electrode | 131 | ⊚ | ○ | Modification Example |
| 25 | 1.00 | 300 | Positive Electrode | — | — | — | — |

TABLE 1-continued

| Sample No. | Carbon (% by mass) | Pressing force (kPa) | Glass sheet abutting side | Life performance | State of turbidity of electrolyte solution | Total assessment | Remarks |
|---|---|---|---|---|---|---|---|
| 26 | 1.00 | 10 | Negative Electrode | 160 | ◎ | ◎ | Example |
| 27 | 1.00 | 20 | Negative Electrode | 168 | ◎ | ◎ | Example |
| 28 | 1.00 | 40 | Negative Electrode | 174 | ◎ | ◎ | Example |
| 29 | 1.00 | 70 | Negative Electrode | 170 | ◎ | ◎ | Example |
| 30 | 1.00 | 100 | Negative Electrode | 168 | ◎ | ◎ | Example |
| 31 | 1.00 | 300 | Negative Electrode | — | — | — | — |
| 32 | 1.50 | 0 | — | 110 | X | X | Comparative Example |
| 33 | 1.50 | 10 | Positive Electrode | 125 | ○ | ○ | Modification Example |
| 34 | 1.50 | 20 | Positive Electrode | 128 | ○ | ○ | Modification Example |
| 35 | 1.50 | 40 | Positive Electrode | 132 | ○ | ○ | Modification Example |
| 36 | 1.50 | 70 | Positive Electrode | 132 | ◎ | ○ | Modification Example |
| 37 | 1.50 | 100 | Positive Electrode | 127 | ◎ | ○ | Modification Example |
| 38 | 1.50 | 300 | Positive Electrode | — | — | — | — |
| 39 | 1.50 | 10 | Negative Electrode | 180 | ◎ | ◎ | Example |
| 40 | 1.50 | 20 | Negative Electrode | 191 | ◎ | ◎ | Example |
| 41 | 1.50 | 40 | Negative Electrode | 205 | ◎ | ◎ | Example |
| 42 | 1.50 | 70 | Negative Electrode | 193 | ◎ | ◎ | Example |
| 43 | 1.50 | 100 | Negative Electrode | 178 | ◎ | ◎ | Example |
| 44 | 1.50 | 300 | Negative Electrode | — | — | — | — |
| 45 | 2.00 | 0 | — | 108 | X | X | Comparative Example |
| 46 | 2.00 | 10 | Positive Electrode | 126 | ○ | ○ | Modification Example |
| 47 | 2.00 | 20 | Positive Electrode | 129 | ○ | ○ | Modification Example |
| 48 | 2.00 | 40 | Positive Electrode | 135 | ○ | ○ | Modification Example |
| 49 | 2.00 | 70 | Positive Electrode | 133 | ◎ | ○ | Modification Example |
| 50 | 2.00 | 100 | Positive Electrode | 130 | ◎ | ○ | Modification Example |
| 51 | 2.00 | 300 | Positive Electrode | — | — | — | — |
| 52 | 2.00 | 10 | Negative Electrode | 161 | ◎ | ◎ | Example |
| 53 | 2.00 | 20 | Negative Electrode | 171 | ◎ | ◎ | Example |
| 54 | 2.00 | 40 | Negative Electrode | 170 | ◎ | ◎ | Example |
| 55 | 2.00 | 70 | Negative Electrode | 168 | ◎ | ◎ | Example |
| 56 | 2.00 | 100 | Negative Electrode | 153 | ◎ | ◎ | Example |
| 57 | 2.00 | 300 | Negative Electrode | — | — | — | — |

State of turbidity

X Significantly turbid (no press, significant in volume-increased products)

○ Turbid, but only slight when compared to the case of no press

◎ hardly turbid

Total assessment X: Life performance is less than 120, or X is assigned for the state of turbidity of the electrolyte solution.

Total assessment ○: Life performance is 120 or more and less than 140, or a score other than X is assigned for the state of turbidity of the electrolyte solution.

Total assessment ◎: Life performance is 140 or more, and ◎ is assigned for the state of turbidity of the electrolyte solution.

TABLE 2

| Sample No. | Carbon (% by mass) | Pressing force (kPa) | Glass sheet abutting side | Life performance | State of turbidity of electrolyte solution | Total assessment | Remarks |
|---|---|---|---|---|---|---|---|
| 58 | 5.00 | 0 | — | 107 | X | X | Comparative Example |
| 59 | 5.00 | 10 | Positive Electrode | 122 | ○ | ○ | Modification Example |
| 60 | 5.00 | 20 | Positive Electrode | 126 | ○ | ○ | Modification Example |
| 61 | 5.00 | 40 | Positive Electrode | 129 | ○ | ○ | Modification Example |
| 62 | 5.00 | 70 | Positive Electrode | 130 | ○ | ○ | Modification Example |
| 63 | 5.00 | 100 | Positive Electrode | 124 | ○ | ○ | Modification Example |
| 64 | 5.00 | 300 | Positive Electrode | — | — | — | — |
| 65 | 5.00 | 10 | Negative Electrode | 149 | ◎ | ◎ | Example |
| 66 | 5.00 | 20 | Negative Electrode | 162 | ◎ | ◎ | Example |
| 67 | 5.00 | 40 | Negative Electrode | 159 | ◎ | ◎ | Example |
| 68 | 5.00 | 70 | Negative Electrode | 157 | ◎ | ◎ | Example |
| 69 | 5.00 | 100 | Negative Electrode | 141 | ◎ | ◎ | Example |
| 70 | 5.00 | 300 | Negative Electrode | — | — | — | — |
| 71 | 10.0 | 0 | — | 51 | X | X | Comparative Example |
| 72 | 10.0 | 10 | Positive Electrode | 53 | X | X | Modification Example |
| 73 | 10.0 | 20 | Positive Electrode | 55 | X | X | Modification Example |
| 74 | 10.0 | 40 | Positive Electrode | 58 | X | X | Modification Example |
| 75 | 10.0 | 70 | Positive Electrode | 60 | X | X | Modification Example |
| 76 | 10.0 | 100 | Positive Electrode | 63 | X | X | Modification Example |
| 77 | 10.0 | 300 | Positive Electrode | — | — | — | — |
| 78 | 10.0 | 10 | Negative Electrode | 69 | X | X | Example |
| 79 | 10.0 | 20 | Negative Electrode | 72 | X | X | Example |
| 80 | 10.0 | 40 | Negative Electrode | 78 | X | X | Example |
| 81 | 10.0 | 70 | Negative Electrode | 81 | X | X | Example |
| 82 | 10.0 | 100 | Negative Electrode | 83 | X | X | Example |
| 83 | 10.0 | 300 | Negative Electrode | — | — | — | — |

State of turbidity
X Significantly turbid (no press, significant in volume-increased products)
○ Turbid, but only slight when compared to the case of no press
◎ hardly turbid
Total assessment X: Life performance is less than 120, or X is assigned for the state of turbidity of the electrolyte solution.
Total assessment ○: Life performance is 120 or more and less than 140, or a score other than X is assigned for the state of turbidity of the electrolyte solution.
Total assessment ◎: Life performance is 140 or more, and ◎ is assigned for the state of turbidity of the electrolyte solution.

It was shown that the state of turbidity of the electrolyte solution and life performance tended to be improved by applying a pressing force to the negative electrode plate. It was also shown that the tendency became more significant as the pressing force was increased. Further, since when carbon content was 5.5% by mass, the electrolyte solution was turbid even though a pressing force was applied, it is preferred that the carbon content is less than 5.5% by mass, or even 5% or less, because the effect of the present invention becomes significant. Also, life performance tended to be improved when the carbon content was 10% by mass or more. Improvement of the state of turbidity could not be confirmed through visual inspection, but it is supposed that the outflow of carbon was suppressed because life performance was improved.

As shown in samples No. 2 to 5, when the carbon content was less than 0.5% by mass, the level in improvement of life performance was low, even when a press force was applied, as compared to the case where the carbon content was 0.5% by mass or more. Improvement of life performance became significant when the carbon content was 0.5% by mass or more (samples No. 7 to 11), but improvement of life performance was very small when the press force was less than 10 kPa (samples No. 6 and 19). Even though there was no difference in pressing force and carbon content, life performance was high and the state of turbidity was insignificant when the elastic sheet abutted on the negative electrode plate (samples No. 13 to 17 and the like) as compared to the case where the elastic sheet abutted on the positive electrode plate (samples No. 7 to 11 and the like).

In the case where the elastic sheet abutted on the negative electrode plate, life performance became maximum when the carbon content was about 1.5% by mass (samples No. 39 to 43). In the case where the elastic sheet abutted on the positive electrode plate, life performance became maximum when the carbon content was about 2.0% by mass (samples No. 46 to 50). On the other hand, when the carbon content was 10% by mass, the negative active material became fragile, so that deformation by the pressing force or collapse due to expansion/shrinkage during a test occurred to reduce life performance to 100 or less, and also turbidity of the electrolyte solution was significant (samples No. 71 to 76 and 78 to 82).

When the pressing force is 10 kPa or more, a significant effect is achieved. The pressing force is more preferably 20 kPa or more and 100 kPa or less, and especially preferably 40 kPa or more and 100 kPa or less. When a pressing force of 300 kPa was applied, the container was cracked.

As described above, in Example, a phenomenon in which carbon flows out from the negative active material was suppressed by applying a pressing force to the negative electrode plate. Accordingly, excessive carbon can be added as compared to heretofore, and sulfation of the negative electrode can be suppressed to improve life performance of the lead storage battery for use in PSOC.

Second Modification Example

Figure 2:
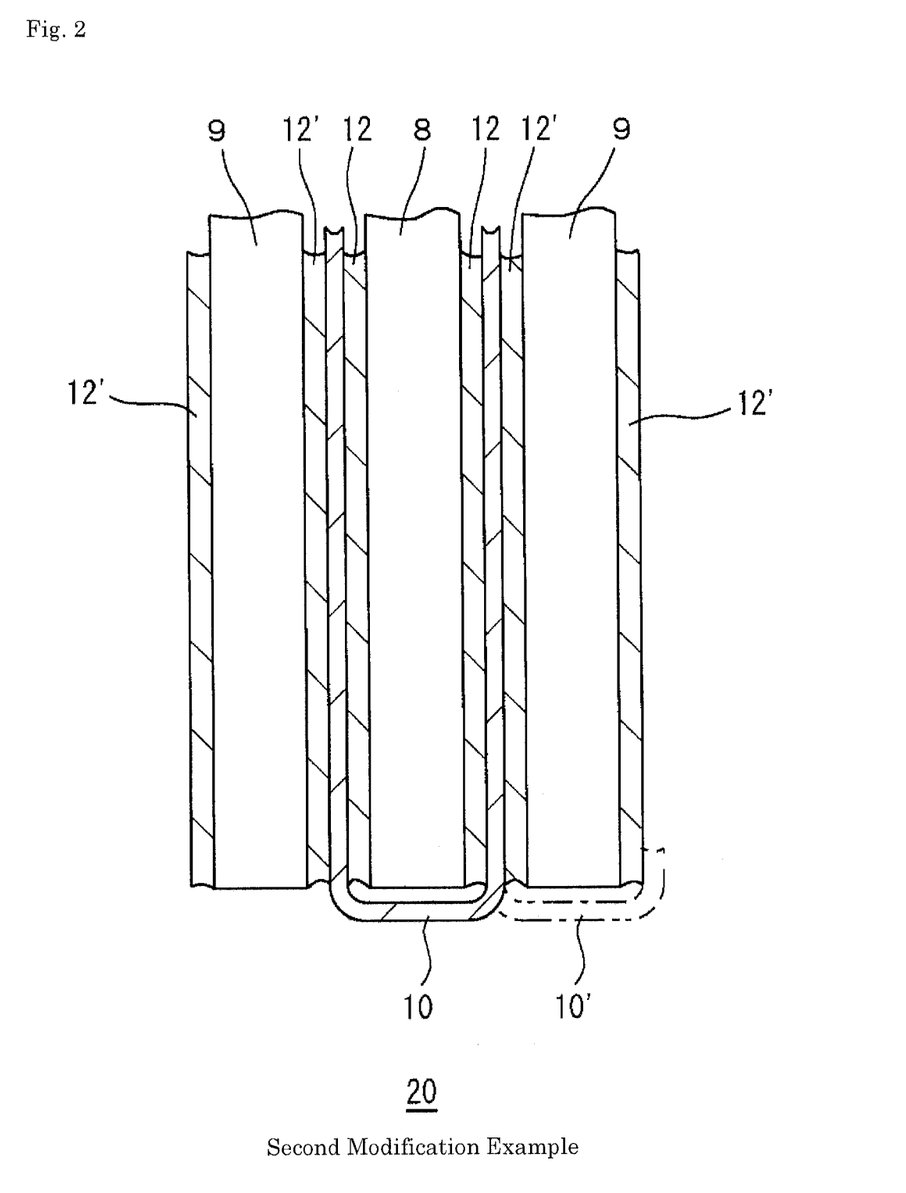
FIG. 2: A vertical sectional view showing a principal constitutional part of a lead storage battery in second Modification Example.

A principal constitutional part 20 of a liquid lead storage battery in second Modification Example is shown in FIG. 2, where the symbols identical to those in FIG. 1 denote the same components. An elastic sheet 12' is also added between a microporous separator 10 and a positive electrode plate 9 with respect to optimum Example in FIG. 1. The additional elastic sheet 12' abuts on the positive electrode plate 9 to prevent a positive active material from falling off the positive electrode plate 9. The additional elastic sheet 12' prevents degradation of the microporous separator 10 by preventing deposits from the positive active material from coming into contact with the microporous separator 10 during charge-discharge. The microporous separator 10 may be changed as shown by a chain line 10' in the figure to store the positive electrode plate 9 instead of storing the negative electrode plate 8.

Battery System

Figure 3:
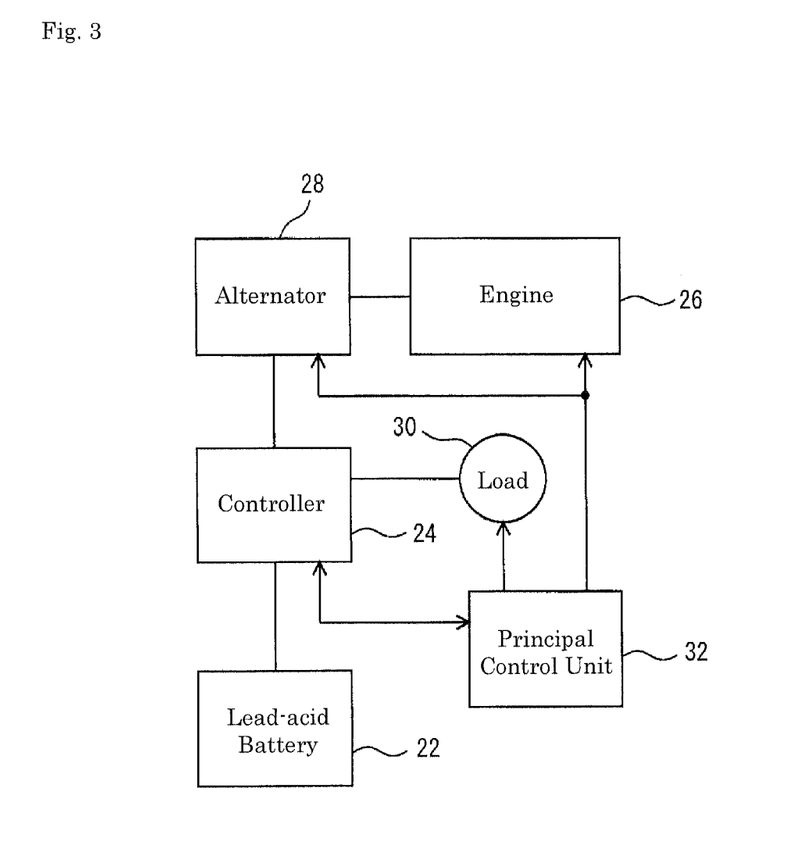
FIG. 3: A block diagram of a storage battery system of Example.

A battery system of Example is shown in FIG. 3, where each arrow shows a flow of signals, and each line with no arrow shows electric power and a transmission of motive power of an engine. The battery system is suitable for a vehicle using a storage battery in PSOC, such as an idling stop car. Reference numeral 22 denotes a liquid lead storage battery of Example, reference numeral 24 denotes a controller of the battery system, reference numeral 26 denotes an engine, reference numeral 28 denotes an alternator that generates electric power by a driving force of the engine 26, reference numeral 30 denotes a load of electrical equipment, an ignition plug, a starter motor or the like, and reference numeral 32 denotes a principal control unit that controls the whole of the idling stop car. The battery system is constituted from the lead storage battery 22 and the controller 24. The principal control unit 32 controls the engine 26, the alternator 28 and the load 30, and the controller 24 controls charge-discharge of the lead storage battery 22 and supply of electric power to the load 30. When the car stops running, the principal control unit 32 allows the engine 26 to be stopped automatically, and the alternator 28 is accordingly stopped. At the time when the alternator 28 is stopped, the load 30 is driven by electric power of the lead storage battery 22, and when the engine 26 is restarted, the principal control unit 32 allows the starter motor to start automatically, and required electric power is supplied from the lead storage battery 22 to the starter motor and the ignition plug. When the car runs again and sufficient electric power is obtained from the alternator 28, the lead storage battery 22 is charged and the load 30 is driven by electric power of the alternator 28.

In this battery system, excellent PSOC life performance is necessary because the frequency with which the lead storage battery 22 is discharged is increased and the frequency with which the lead storage battery 22 is charged is decreased. On the other hand, durability to overcharge becomes less important. Since the lead storage battery is a liquid lead storage battery, it is necessary that the liquid surface of the electrolyte solution be capable of being identified for water addition and the like. In the lead storage battery 22 of Example, life performance in PSOC is high, and turbidity of the electrolyte solution is insignificant, so that a battery system suitable for an idling stop car is obtained. In this battery system, the frequency with which the lead storage battery 22 is in an overcharge state is low. Therefore, even when the microporous separator 10 is brought into contact with the positive electrode plate 9, degradation of the microporous separator 10 by oxidation is suppressed, so that a battery system suitable for an idling stop car is obtained.

DESCRIPTION OF REFERENCE SIGNS 2, 4, 6, 20 principal constitutional part of liquid lead storage battery
8 negative electrode plate
9 positive electrode plate
10 microporous separator
12 elastic sheet
22 liquid lead storage battery
24 controller
26 engine
28 alternator
30 load
32 principal control unit

The invention claimed is:

1. A liquid lead storage battery comprising a negative electrode plate, a positive electrode plate and an electrolyte solution, the both plates being arranged so as to face each other in a thickness direction and immersed in the electrolyte solution, wherein
   the negative electrode plate includes an active material containing carbon,
   a first microporous thin film separator is in direct contact with the positive electrode plate and arranged between the negative electrode plate and the positive electrode plate,
   a first porous elastic sheet is in direct contact with the first microporous thin film separator and a first surface of the negative electrode plate, and arranged between the negative electrode plate and the positive electrode plate so as to press the negative electrode plate from both sides in the thickness direction,
   a second porous elastic sheet is in direct contact with a second surface of the negative electrode plate, the second surface of the negative electrode plate being in parallel to the first surface of the negative electrode plate, a second microporous thin film separator is in direct contact with the second porous elastic sheet, and the first and second microporous thin film separators are thinner than the first and second elastic sheets and have an average pore diameter smaller than that of the first and second porous elastic sheets.

2. The liquid lead storage battery according to claim 1, wherein the first and second microporous thin film separators comprise polyethylene.

3. The liquid lead storage battery according to claim 1, wherein the first and second porous elastic sheets have a porosity of more than 90% and 95% or less, or an average pore diameter of 100 μm or more.

4. The liquid lead storage battery according to claim 1, wherein the negative active material contains the carbon in an amount of 0.3% by mass or more and less than 10% by mass.

5. The liquid lead storage battery according to claim 1, wherein the liquid lead storage battery further includes a container in which the negative electrode plate and the positive electrode plate are stored and the electrolyte solution is retained, and a gap is formed between any one of the upper parts, side faces and bottom faces of the negative electrode plate and the positive electrode plate, and the container.

6. The liquid lead storage battery according to claim 1, wherein the first and second microporous thin film separators are bag-shaped, and the negative electrode plate is stored in the bag-shaped first and second microporous thin film separators.

7. The liquid lead storage battery according to claim 1, wherein the first microporous thin film separator is connected to the second microporous thin film separator.

8. The liquid lead storage battery according to claim 1, wherein the first and second microporous thin film separators are made of a single sheet.

9. A liquid lead storage battery comprising a negative electrode plate, a positive electrode plate and an electrolyte solution, the both plates being arranged so as to face each other in a thickness direction and immersed in the electrolyte solution, wherein the negative electrode plate includes an active material containing carbon, a first and second porous elastic sheets are arranged between the negative electrode plate and the positive electrode plate so as to press the negative electrode plate from both sides in the thickness direction, the first porous elastic sheet being in direct contact with the positive electrode plate, the second porous elastic sheet being in direct contact with the negative electrode plate, a microporous thin film separator is arranged between the first and second porous elastic sheets and in direct contact with the first and second porous elastic sheets, and the microporous thin film separator is thinner than the first and second porous elastic sheets and has an average pore diameter smaller than that of the first and second porous elastic sheets.

10. The liquid lead storage battery according to claim 9, wherein the microporous thin film separator comprises polyethylene.

11. The liquid lead storage battery according to claim 9, wherein the first and second porous elastic sheets have a porosity of more than 90% and 95% or less, or an average pore diameter of 100 μm or more.

12. The liquid lead storage battery according to claim 9, wherein the negative active material contains the carbon in an amount of 0.3% by mass or more and less than 10% by mass.

13. The liquid lead storage battery according to claim 9, wherein the liquid lead storage battery further includes a container in which the negative electrode plate and the positive electrode plate are stored and the electrolyte solution is retained, and a gap is formed between any one of the upper parts, side faces and bottom faces of the negative electrode plate and the positive electrode plate, and the container.

* * * * *